J. BANNON AND F. W. THOROLD.
APPARATUS FOR SEPARATING LIQUIDS.
APPLICATION FILED MAR. 14, 1919.
1,355,934.
Patented Oct. 19, 1920.
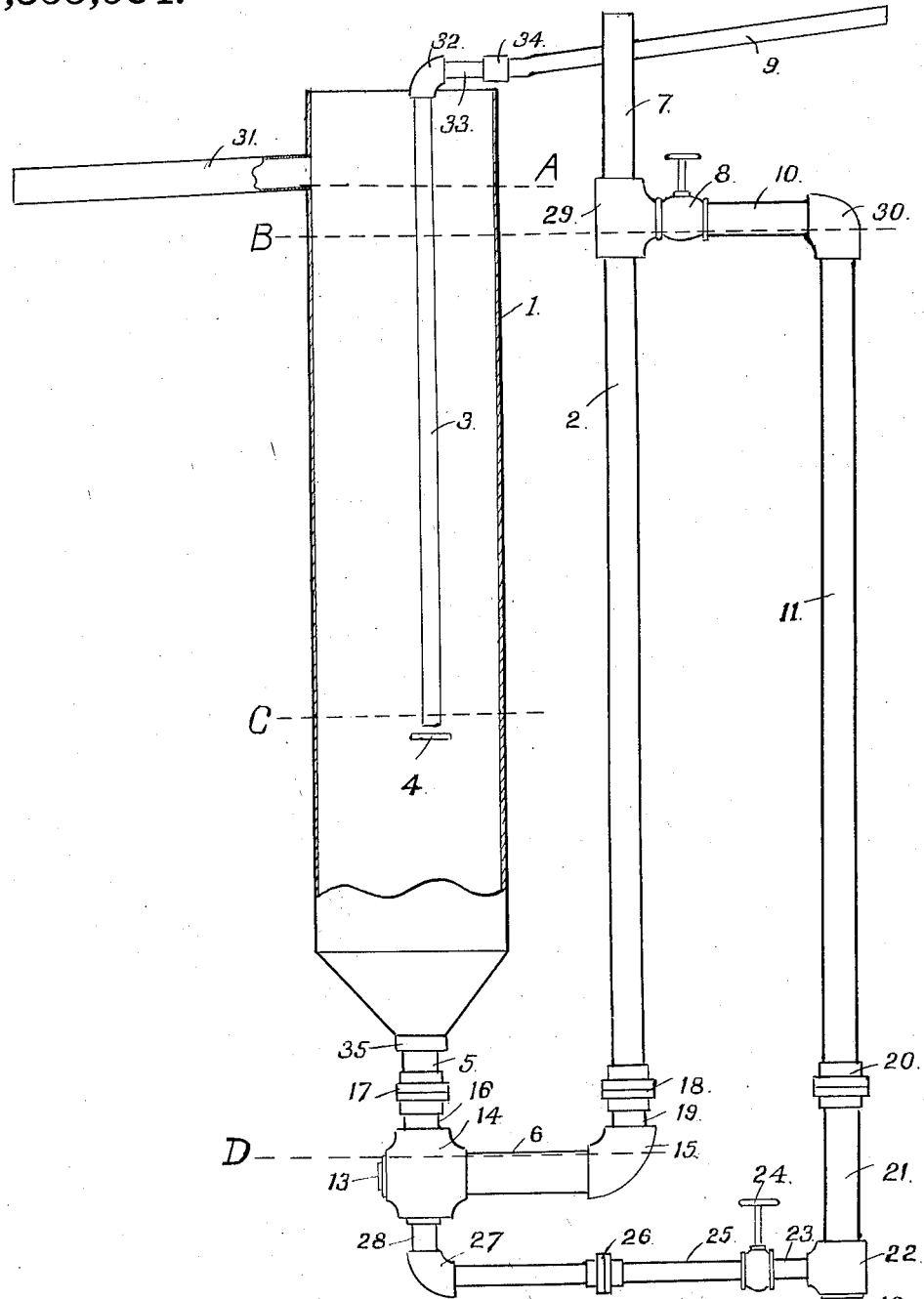
Inventors John Bannon,
Frederick W. Thorold
By Wm. J. Herdman.
Attorney.

UNITED STATES PATENT OFFICE.

JOHN BANNON AND FREDERICK W. THOROLD, OF TORONTO, ONTARIO, CANADA.

APPARATUS FOR SEPARATING LIQUIDS.

1,355,934.      Specification of Letters Patent.     Patented Oct. 19, 1920.

Application filed March 14, 1919. Serial No. 282,697.

*To all whom it may concern:*

Be it known that we, JOHN BANNON and FREDERICK W. THORWOLD, citizens of the Dominion of Canada, and residents of Toronto, county of York, and Province of Ontario, Canada, have jointly invented a new and useful Improvement in Apparatus for Separating Liquids, of which the following is a specification.

Our invention relates to apparatus for separating mechanical mixtures of liquids and pertains specifically to that class of such apparatus which employ as the principle of their operation the difference in specific gravity of the various liquids comprising the mixture to be separated.

The principal objects of our invention comprise, producing a separator which employs no automatic valves or other moving parts whatever, that requires no application of mechanical energy for its operation, that is simple and fool proof in construction, and that requires a minimum of attention in operation and maintenance.

We accomplish these very desirable features, and others which will hereinafter be pointed out and described by means of a novel arrangement of apparatus and piping of proportioned cross sectional area whereby the liquids to be separated are by their differences in specific gravity segregated into a plurality of hydrostatically balanced columns of variant heights that one liquid may be drawn off at the surface of the liquid in one column while another liquid may be likewise drawn off at the surface of liquid in another column.

In the drawing which accompanies and forms a part of this specification we have illustrated a partially sectioned elevation of one embodiment of our invention.

Referring now to the drawing, our device comprises a cylindrical member or container 1, the upper extremity of which is open to the atmosphere while the lower extremity is tapered and provided with a collar 35 united thereto in a liquid tight manner. The collar 35 is threaded to admit a pipe nipple 5 which is joined through the coupling 17 with a pipe nipple 16 which is in turn threaded into a cross 14. One aperture of the cross is provided with a plug 13 while the aperture opposite thereto is provided with a short length of pipe 6. An elbow is threaded to the pipe 6, into which is threaded in turn a nipple 19 joined through a coupling 18 with a pipe 2, which is maintained with its longitudinal axis substantially parallel to and in the same plane with the longitudinal axis of the cylindrical member 1. The pipe 2 is in length approximately the length of the member 1 and is provided with a T 29 into the opposite aperture of which a short length of pipe 7 is threaded. The pipe 7 is open at its extremity to provide a vent. The remaining aperture of the T 29 is connected through a globe valve 8 and short length of pipe 10 with an elbow 30, into which a length of pipe 11 is threaded. The pipe 11 is joined through coupling 20 and short pipe length 21 to a T 22, into the opposite aperture of which a length of pipe 12 is threaded to connect the apparatus to a drain. A nipple 28 is threaded into the cross 14 and is connected through elbows 27, coupling 26, pipe 25, globe valve 24 and nipple 23 to T 22, thus providing a drain for the cylindrical member 1 and the stand pipe 2. The cylindrical member 1 is provided near its upper extremity with an outlet pipe 31. An inlet is provided for the system of piping by means of pipe 9, coupling 34, nipple 33, elbow 32 and length of pipe 3. Opposite the open extremity of the pipe 3 there is placed a baffle plate 4.

The container 1 and its associated piping broadly constitute a U tube provided with a liquid inlet 3, an outlet 31 in one arm and an outlet in its other arm through pipe 10, and is a means for providing a pair of liquid columns in communication and hydrostatically balanced with respect to each other.

Obviously, if the valve 8 is opened, the valve 24 closed and our device filled with water admitted through the inlet pipe 3, water will rise in both container 1 and pipe 2 until it reaches the lower outlet level at pipe 10, the level being indicated by the dotted line B. After the water reaches this level the columns of water in both container 1 and pipe 2 are balanced and equal in height. If now an oil that is lighter than water be admitted to the container 1 a certain amount of water will be displaced and will drain off through the pipe 10 and a column of oil will rise in container 1 until, the specific gravity of the oil being less than that of the water, a somewhat higher column of oil will be balanced by a column of water of less height. If we let the level of the oil in container 1 be indicated by the dotted line A it will be observed that the addition of any more oil will cause oil to leave container 1 through the outlet 31 and thus we will have a column of water in pipe 2, whose height is indicated by the dotted line B, and a column of oil in container 1 the height of which is indicated by the dotted line A, the column of oil and the column of water just balancing each other. The line of separation of the oil and the water will be somewhere between the dotted line B and the dotted line D indicating the upper surface of the liquid in the communicating pipe 6, and is indicated by the dotted line C. We preferably extend the inlet pipe 3 such a distance into the container 1 that its extremity lies approximately at the line of separation between the oil and the water. Thus the incoming mixture is delivered against the baffle plate 4 and the lighter liquid is partially separated from the heavier liquid at the level of separation of the two liquids.

Naturally the dimensions and proportions of our device will depend upon the nature of the liquids comprising the mixture which it is desired to separate. We have found by calculation and experiment that when our device is used to separate an oil of specific gravity of 0.915 from water that the distance between the dotted lines B and D should preferably be about 120 inches, then if the difference in level between the oil and water columns, indicated by the difference in height between the lines A and B, is arbitrarily chosen as 6.5 inches, calculation and experiment show that a column of water 70 inches in height just counterbalances a column of the oil 76.5 inches in height and the line of separation between the oil and the water will lie on the dotted line C, a distance of 50 inches above the dotted line D. This latter distance is amply sufficient, as shown by experiment, to prevent any oil from finding its way into the pipe 2 and out of the outlet pipe 10. The relation existing between the height of the light and heavy columns and the specific gravity of the liquids is expressed in the formula:

$$X = \frac{Y}{\frac{G_2}{G_1} - 1}$$

In which Y is equal to the distance between the lines A and B on the drawing while X is the distance between the lines B and C, and $G_1$ is the specific gravity of the lighter liquid and $G_2$ is the specific gravity of the heavier liquid. We have further found by experiment that it is desirable in separating an oil, of the specific gravity above referred to, from water to have the pipe 2 and pipe 10 and the pipe connecting these pipes to the drain about three inches in diameter while the inlet pipe 3 is preferably about one inch in diameter and the container 1 is about eight inches in diameter. The reason for providing a relatively greater diameter for the container 1 is in order to reduce the velocity of the liquids in this container to a minimum to allow time for the difference in specific gravity of the liquids to act in causing a separation of the liquids. We prefer to have the outlet pipe 31 about 3 inches in diameter also. Obviously as the outlets 31 and 10 are each considerably larger in diameter than the inlet pipe 3, the mixture of liquids may not be fed into the system at a higher rate than they can drain from the system and thus the height of the liquid columns are maintained substantially unchanged.

The system of piping may be drained of any sediment by opening the globe valve 24, and any sediment which tends to clog the drain may be removed by removing the plug 13 in the cross 14.

In operating our device we close valve 24 open valve 8 and admit water through the inlet pipe 3 until the water levels in container 1 and pipe 2 reach the level indicated by the dotted line B, after which we admit the mixture of oil and water or other mixture until sufficient water has been displaced to leave a water column which just balances the oil column as heretofore described, and thereafter begin to drain off the oil from outlet 31 and waste water through pipes 10, 11, 21 and 12. When all of the mixed liquid that it is desired to separate has been admitted to the system we shut valve 8 and admit water through inlet pipe 3 to gradually displace the oil in container 1 and draw off this oil down to a point as near to the line of separation between the oil and the water as is desired or advisable.

It will be observed from the foregoing that our device employs no automatic valves or other moving parts whatever, that no addition of mechanical energy is necessary for its operation and that the device is extremely simple in construction and operation. It will be further observed that the liquid columns are hydrostatically balanced with respect to each other although due to the difference in specific gravity of the liquids in each column the columns vary considerably in height and that it is this variation in height which permits us to draw off the liquids separately.

While we have illustrated and described fully one embodiment of our device it is to be clearly understood that we may vary the details thereof without departing from the spirit or narrowing the scope of our invention.

Having thus described our invention what we claim as new and desire to secure by United States Letters Patent is as follows:

1. In a liquid separator, a pair of vertically disposed containers of different cross sectional area in communication at their lower extremities, said container of larger cross sectional area containing a column of liquid composed of two liquids of different specific gravities, and said container of smaller cross sectional area containing a column of liquid of similar specific gravity to one of the liquids contained in the larger of said containers, the liquid columns being hydrostatically balanced, an inlet pipe entering the larger of said containers and terminating substantially at the line of separation between the two liquids in said container, an overflow outlet for each of said containers, said outlets being located substantially at the levels of the liquids in said containers and said outlets being in cross sectional area each relatively greater than the cross sectional area of said inlet.

2. In a liquid separator, a pair of vertically disposed containers of different cross sectional area in communication at their lower extremities, said container of larger cross sectional area containing a column of liquid composed of two columns of liquids of different specific gravities, and said container of smaller cross sectional area containing a column of liquid of similar specific gravity to one of the liquids contained in the larger of said containers, the liquid columns being hydrostatically balanced, an inlet pipe entering the larger of said containers and terminating substantially at the line of separation between the two liquid columns in said container, an overflow outlet for each of said containers and said outlets being located substantially at the levels of the liquids in said containers.

Signed by us at Toronto, county of York, and Province of Ontario, in the presence of two witnesses.

JOHN BANNON.
FREDERICK W. THOROLD.

Witnesses:
L. NEUSOME,
W. E. DENT.